United States Patent
Kanamarlapudi et al.

(10) Patent No.: US 9,491,276 B2
(45) Date of Patent: Nov. 8, 2016

(54) USER EQUIPMENT CAPABILITY REPORT MANAGEMENT DURING CALLER ID EXTRACTION

(71) Applicant: QUALCOMM Incorporated, San Diego, CA (US)

(72) Inventors: Sitaramanjaneyulu Kanamarlapudi, San Diego, CA (US); Arvindhan Kumar, San Diego, CA (US); Liangchi Hsu, San Diego, CA (US); Chetan Chakravarthy, San Diego, CA (US); Yongsheng Shi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/823,893

(22) Filed: Aug. 11, 2015

(65) Prior Publication Data

US 2016/0301790 A1 Oct. 13, 2016

Related U.S. Application Data

(60) Provisional application No. 62/144,766, filed on Apr. 8, 2015.

(51) Int. Cl.
| | |
|---|---|
| *H04W 68/00* | (2009.01) |
| *H04M 1/57* | (2006.01) |
| *H04B 1/3816* | (2015.01) |
| *H04W 8/18* | (2009.01) |
| *H04W 24/10* | (2009.01) |

(52) U.S. Cl.
CPC ........... *H04M 1/575* (2013.01); *H04B 1/3816* (2013.01); *H04W 8/183* (2013.01); *H04W 24/10* (2013.01); *H04W 68/005* (2013.01)

(58) Field of Classification Search
CPC .......................... H04W 76/048; H04M 11/00
USPC ............................ 455/414–415, 452.1–452.3
See application file for complete search history.

(56) References Cited

U.S. PATENT DOCUMENTS

| | | | | |
|---|---|---|---|---|
| 9,232,556 | B2 * | 1/2016 | Su ........................ | H04W 76/048 |
| 2003/0092432 | A1 * | 5/2003 | Hwang ................. | H04M 1/575 |
| | | | | 455/415 |
| 2014/0120925 | A1 | 5/2014 | Kanthala et al. | |

OTHER PUBLICATIONS

3GPP TS 25.331 V12.5.0 (Mar. 2015) 3$^{rd}$ Generation Partnership Project; Technical Specification Group Radio Access Network; Radio Resource Control (RRC); Protocol specification (Release 12), 2225 pp.

(Continued)

*Primary Examiner* — Michael T Vu
(74) *Attorney, Agent, or Firm* — Arent Fox LLP (57) ABSTRACT

Aspects of user equipment capability reporting include receiving a paging signal for a second subscription during a tune away from an active voice call on a first subscription, sending a report of less than a full set of user equipment capability information to the network for the second subscription during a connection setup in response to the paging signal for the second subscription, extracting a caller identification (ID) associated with the paging signal for the second subscription during the tune away from the voice call on the first subscription, and initiating a transmission to the network for sending the full set of UE capability information for the second subscription in response to the voice call on the first subscription ending.

20 Claims, 3 Drawing Sheets

(56) References Cited

OTHER PUBLICATIONS

Ericsson: "Discussion on Transfer of UE E-Utra Capability Information for rSRVCC", 3GPP Draft, S2-133228_Dp Discussion on Transfer_Of_UE E-Utra_Capabilities, 3rd Generation Partnership Project (3GPP), Mobile Competence Centre, 650, Route Des Lucioles, F-06921 Sophia-Antipolis Cede, vol. SA WG2, No. Xiamen, P.R. China, 20130923—20130927 Sep. 18, 2013, XP050726593, pp. 1-2,Retrieved from the Internet: URL:http://www.3gpp.org/ftp/tsg_sa/WG2_Arch/TSGS2_99_Xiamen/Docs/ [retrieved on Sep. 18, 2013] Chapter 3.

International Search Report and Written Opinion—PCT/US2016/022516—ISA.EPO—May 30, 2016 (152795WO). 14 Total Pages.

* cited by examiner

USER EQUIPMENT CAPABILITY REPORT MANAGEMENT DURING CALLER ID EXTRACTION

CLAIM OF PRIORITY UNDER 35 U.S.C. §119

The present Application for Patent claims the benefit of Provisional Application No. 62/144,766, filed Apr. 8, 2015, which is assigned to the assignee hereof and hereby expressly incorporated in its entirety by reference herein.

BACKGROUND

Aspects of the present disclosure relate generally to wireless communication systems, and more particularly to processing communications related to multiple subscriptions.

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

In some wireless networks, a user equipment (UE) can have multiple subscriptions to one or more networks (e.g., by employing multiple subscriber identity module (SIM) cards or otherwise). Such a UE may include, but is not limited to, a dual-SIM, dual standby (DSDS) device. For example, a first subscription may support a first technology standard, such as Wideband Code Division Multiple Access (WCDMA), while a second subscription may be a different subscription to the same technology standard or may support a second technology standard, such as Global System for Mobile Communications (GSM) Enhanced Data rates for GSM Evolution (EDGE) (also referred to as GERAN). Where the UE utilizes a single transceiver to communicate over the multiple subscriptions and/or networks, the UE can tune the transceiver to a given subscription and/or network during a given period of time to communicate therewith, but can only communicate in a single subscription and/or network at a given period of time. As such, when the UE has an active call with the first subscription, the UE may periodically tune away to the second subscription to monitor signals or acquire a connection. During such a tune away mode, the UE loses throughput on the active call with the first subscription due to the inability to receive signals corresponding to the first subscription (e.g., a SUSPEND state). Further, if the tune away mode persists for a relatively long time, then the network managing the active call of the first subscription may determine that the UE is no longer connected due to lack of activity, and thus may terminate the active call of the first subscription.

During a tune away from an active call on a first subscription, the UE may receive a paging signal for initiating a call session on the second subscription. An upper protocol layer (e.g., a radio resource control (RRC) protocol layer) may then commence a connection setup procedure during the tune away period so that the UE may connect to a network using the second subscription, including exchanging of connection messages between the UE and the network. For example, a RRC connection request signal from the UE to the network may provide the UE ID to the network, and an RRC connection setup signal response to the UE may include transport channel information.

To complete the connection setup, the UE may send a RRC connection setup complete signal that includes UE capability information to the second subscription network, so that the network can provide resources to the UE that are compatible with the UE capability. For example, if the UE is enabled to communicate on an enhanced UMTS terrestrial radio access network (E-UTRAN) using high speed and high throughput resources, the UE may send an information element that indicates these capabilities to the network, allowing access to such resources. Subsequently, the UE may receive a downlink direct transfer signal from the second subscription network, from which the caller ID of the second subscription call may be extracted.

In order to maintain voice quality for the active first subscription call session, this connection setup procedure for the second subscription should be kept to as short a duration as possible. Disruption to the active call session may be perceptible to the user when the tune away period is prolonged during the connection setup procedure. One source for a problematic delay is the RRC connection setup complete message generation and transmission when the UE capability information is expansive to include a long list of enhanced capabilities, such as for E-UTRAN resources. For example, when the UE capabilities include E-UTRAN capabilities, the UE may require about 120 protocol data units (PDUs) compared to about 10 PDUs if E-UTRAN capability information is excluded. The impact of transporting these extra PDUs of UE capability information is that the transport duration could be between 2-5 seconds, which would likely be perceptible to the user as a disruption of the active voice call session for this tune away period. With dual receive and single transmit mode of multiple SIM operation, the interruption of a circuit switched (CS) call subscription may be even more severe. Moreover, the UE may be setup to only handle a single SIM call session at a time, and provide an indication of a missed call arriving on the second subscription to the user with the caller ID so that the user may call the caller back after concluding the established call. Hence, the disruption of the active call session for merely extracting the caller ID is bothersome to the user.

Therefore, improvements in the UE capability reporting during a tune away mode are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the disclosure relates to a multi-subscription user equipment (UE) reporting UE capability information to a network entity.

For instance, in an aspect, the disclosure provides a method of capability reporting for a multi-subscription UE, including initiating a connection setup for a second subscription during a tune away from an active voice call on a first subscription; sending a report of less than a full set of user equipment capability information to the network for the second subscription during the connection setup; extracting a caller identification (ID) associated with the connection setup for the second subscription during the tune away from the voice call on the first subscription; and sending the full set of user equipment capability information to the network for the second subscription in response to ending the voice call on the first subscription.

In another aspect, the disclosure provides a UE including a transceiver configured to transmit a connection setup signal for a second subscription during a tune away from an active voice call on a first subscription, and at least one processor coupled to the transceiver via a bus. The at least one processor includes a caller ID extraction component configured to extract a caller identification (ID) associated with the connection setup for the second subscription during the tune away from the voice call on the first subscription. Also, the at least one processor includes a capability report component configured to generate a report of less than a full set of UE capability information for sending to the network for the second subscription during the connection setup, and to send the full set of user equipment capability information to the network for the second subscription in response to the voice call on the first subscription ending.

In another aspect, the disclosure provides a computer-readable medium storing computer executable code for initiating a connection setup for a second subscription during a tune away from an active voice call on a first subscription; code for generating a report of less than a full set of user equipment capability information for sending to the network for the second subscription during the connection setup; code for extracting a caller identification (ID) associated with the connection setup for the second subscription during the tune away from the voice call on the first subscription; and code for sending the full set of user equipment capability information to the network for the second subscription in response to ending the voice call on the first subscription.

BRIEF DESCRIPTION OF THE DRAWINGS

The accompanying drawings are presented to aid in the description of various aspects of the disclosure and are provided solely for illustration of the aspects and not limitation thereof. The drawings include like reference numbers for like elements, and may represent optional components or actions using dashed lines.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts. In an aspect, the term "component" as used herein may be one of the parts that make up a system, may be hardware, firmware, and/or software, and may be divided into other components.

The present disclosure provides for managing UE capability reporting messages by a multiple subscription UE that suspends an active voice call session from a first subscription during a tune away for monitoring a network of another subscription. During the tune away, which includes an upper layer connection setup for a second subscription and a caller ID extraction related to an incoming call from the second subscription, the UE capability report for the second subscription may transport less than a full set of UE capability information to minimize the connection setup duration during the tune away. For example, the UE may exclude one or more enhanced capabilities in the UE capability report to shorten the transmission of information elements. By minimizing the tune away duration, perceptible disruption to the active voice call session on the first subscription may be avoided while still allowing an extraction of the caller ID for the second subscription. Moreover, the present aspects recognize that such interruption for exchanging a full set of UE capability information may be unwarranted considering that delivery of the caller ID for the second subscription call without establishing a call session on the second subscription (e.g., the user sees the caller ID and disregards it, choosing to stay on the first call) negates the need for transporting UE capability information on the second subscription. In any case, upon concluding the call session on the first subscription, the UE may initiate transport of an updated UE capability report for the second subscription network to the network, wherein the updated UE capability report includes a full set of the UE capability information. As such, based on the updated UE capability report, the network will identify the UE as having capability to enjoy a full range of resources compatible with the UE's enhanced capabilities instead of a reduced set of features as indicated by the less than full set of UE capability information sent previously. Since the UE is no longer in an active call on the first subscription, the longer duration of the full UE capability report transport is of little consequence to competing activity of the first subscription. Thus, the present aspects allow the UE to manage capability reports more efficiently based on its operation state.

Figure 1:
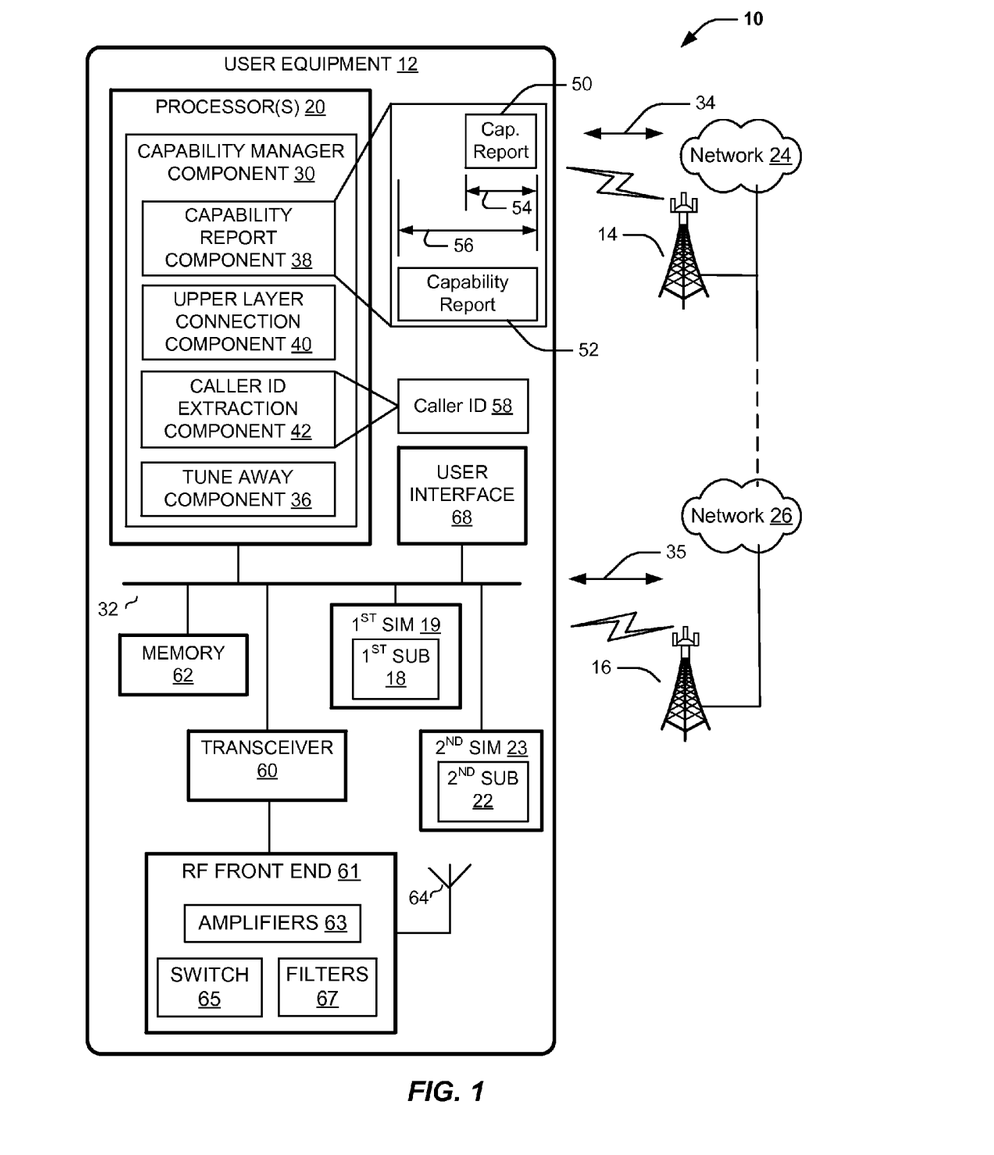
FIG. 1 is a schematic diagram of a communication network including network entities and a user equipment having an aspect of a capability manager for managing UE capability information during caller ID extraction.

Referring to FIG. 1, in an aspect, a wireless communication system 10 includes a user equipment (UE) 12 having multiple subscriptions to a plurality of networks, one or more processors 20, and a capability manager component 30 that can adjust the size of capability reports depending on the operation state of each subscription. For instance, UE 12 can communicate with a first base station 14 and/or a second base station 16 utilizing multiple subscriptions to one or more networks. In an example, UE 12 may have a first subscription 18 related to first network 24 and second subscription 22 related to the same network, such as first network 24, or to a different network, such as second network 26. For instance, each subscription 18 and 22 may relate to a different account and/or different services on the same network or on different networks. In the case of the same network, UE 12 may for example communicate with network 24 via base station 14 using communication link 34 for both subscriptions 18 and 22. In some aspects, each subscription 18 and 22 optionally may be maintained on a respective first SIM 19 and second SIM 23. As such, in one aspect, UE 12 may be a multi-SIM, multi-standby device, such as a dual-SIM, dual standby (DSDS) device. Accordingly, UE 12 may at least communicate in first network 24 via first base station 14 using first subscription 18. Moreover, UE 12 may communicate in second network 26 via first base station 14 and/or via a different base station, such as second base station 16, using second subscription 22. Further, first network 24 and second network 26 can use the same or different radio access technologies (RAT) to facilitate communicating with UEs. Additionally, first base station 14 and second base station 16 can each be a macrocell, picocell, femtocell, relay, Node B, mobile Node B, UE (e.g., communicating in peer-to-peer or ad-hoc mode with UE 12), or substantially any type of component that can communicate with UE 12 to provide wireless network access via a subscription at the UE 12.

According to the present aspects, UE 12 may include one or more processors 20 communicatively coupled to memory 62, first subscriber identity module (SIM) 19, second SIM 23, user interface 68, and transceiver 60 via bus 32. One or more processors 20 may execute various components related to managing capability reports for multiple subscriptions as described herein. UE 12 may include one or more processors 20 which may be a specially programmed or configured computer device operable to perform the variable sized UE capability reporting as described herein. One or more processors 20 can include a single or multiple set of processors or multi-core processors and may be implemented as an integrated processing system and/or a distributed processing system. In some aspects, the various components related to managing UE capability information during carrier ID extraction may be executed by a single processor, while in other aspects different ones of the components may be executed by a combination of two or more different processors. For example, in an aspect, one or more processors 20 may include any one or any combination of a modem baseband processor, or a digital signal processor, or a transmit processor, or a transceiver processor.

In particular, the one or more processors 20 may include capability manager component 30 configured to control the size of the UE capability report transmitted to network 26 during a tune away. In an aspect, capability manager component 30 may include hardware (e.g., one or more processor modules of the one or more processors 20) and/or software code or instructions stored on a computer-readable medium (e.g., memory 62) and executable by at least one of the one or more processors 20 for controlling the size of the capability report during a tune away. Capability manager component 30 may be configured to initiate a connection setup to a network for a second subscription during a tune away from an active voice call on a first subscription. For example, while UE 12 is in idle mode for the first subscription 18 during the tune away, transceiver 60 may receive an idle mode signal, such as a paging signal, from network 26 related to an incoming call. In response to the paging signal, capability manager component 30 may initiate a radio resource connection (RRC) setup with network 26. Capability manager component 30 may be further configured to send a capability report 50 of less than a full set of UE capability information to the network 26 for the second subscription 22 during the connection setup. For example, information normally included in a full capability report 52, such as information related to enhanced capabilities of UE 12 (e.g., one or more information elements) may be omitted from the capability report 50 to keep the tune away period as short as possible. In other words, a size 54 (e.g., in bits) of the "reduced size" capability report 50 may be less than, and in some cases substantially less than, a size 56 (e.g., in bits) of the "full size" capability report 52. The capability manager component 30 may be further configured to extract a caller identification (ID) 58 for the second subscription 22 during the tune away from the voice call on the first subscription 18. For example, UE 12 may receive a downlink direct transfer setup signal with information that includes the caller ID 58 for the incoming call, and from the received information, capability manager component 30 can identify and extract the caller ID 58, and send it to user interface 68 for display to the user. Capability manager component 30 may be further configured to send the full set of UE capability information, e.g., an updated UE capability report 52, to the network for the second subscription in response to the voice call on the first subscription ending. For instance, after the caller ID 58 is extracted and UE 12 tunes back to the connection with the first subscription 18, the active voice call may continue uninterrupted due to the minimized tune away due to the "reduced size" capability report 50. Triggered by the user ending the call on the first subscription via user interface 68, capability manager component 30 may release the connection to the first subscription 18, and automatically initiate a connection to network for the second subscription 22 and send an updated UE capability report 52 with the full set of UE capability information.

Returning to FIG. 1, according to the present aspects, the capability manager component 30 may include capability report component 38. In an aspect, capability report component 38 may include hardware (e.g., one or more processor modules of the one or more processors 20) and/or software code or instructions stored on a computer-readable medium (e.g., memory 62) and executable by at least one of the one or more processors 20 for preparing the UE capability information for the second subscription and controlling the size of the report (e.g., the number of PDUs for transport) based on whether the UE 12 has an established voice call session on the first subscription 18, or if the call session on the first subscription 18 has concluded. For example, in order to minimize the interruption to an established first call session, capability report component 38 may setup a reduced size capability report for the second subscription 22 for transport. The capability report component 38 may setup a full UE capability report for immediate transport to network 26 upon concluding the established first call session.

According to the present aspects, the capability manager component 30 may include an upper layer connection component 40. In an aspect, the upper layer connection component 40 may include hardware (e.g., one or more processor modules of the one or more processors 20) and/or software code or instructions stored on a computer-readable medium (e.g., memory 62) and executable by at least one of the one or more processors 20 for initiating a connection setup to the second subscription during a tune away from an active voice call on a first subscription. The upper layer connection component 40 may be further configured determine that a first call session is currently established on the first subscription, such that the capability report component 38 may be triggered to setup and transport a less than full UE capability report. The upper layer connection component 40 may be further configured determine that a first call session has concluded such that the capability report component 38 may be triggered to setup and transport a full UE capability report.

According to the present aspects, the capability manager component 30 may include a caller ID extraction component 42. In an aspect, the caller ID extraction component 42 may include hardware (e.g., one or more processor modules of the one or more processors 20) and/or software code or instructions stored on a computer-readable medium (e.g., memory 62) and executable by at least one of the one or more processors 20 for extracting the caller ID 58 for the second subscription from a downlink signal from the network 24 or 26, during the tune away from the voice call on the first subscription.

The capability manager component 30 may also be configured to manage communication exchange signaling associated with first subscription 18 and/or second subscription 22 via a transceiver 60. For example, capability manager component 30 may include and execute communication protocols and/or manage other standards-specific communication procedures using protocol-specific and/or standards-specific instructions and/or subscription-specific configuration information that allow communications with first network 24 and second network 26. Further, transceiver 60 may be configured to transmit and/or receive the communication exchange signaling to and/or from one or more base stations or other devices in wireless communication system 10. For example, in an aspect, transceiver 60 may be in communication with, or connected to, a radio frequency (RF) front end 61 defined by, for instance, one or more power amplifiers 63, one or more band specific filters 67, and one or more antennas 64. When a downlink signal is received by UE 12, such as a paging signal from second network 26 for example, antenna 64 converts radio waves to an electrical signal. Antenna switch 65 may be a duplex switch that may selectively operate to select either a transmit path or a receive path for the signal (e.g., to select a receive path in this example). Filters 67 perform frequency filtering on the signal to obtain the desired frequency band. Transceiver 60 may perform a downconversion of the received signal from RF front end 61, and may split the signal into in-phase and quadrature (I and Q) components. Amplifiers 63 may include a first amplifier to boost the filtered signal initially received from filters 67, and a second amplifier for boosting the I and Q components. The I and Q components may then be converted to a digital format and demodulated by transceiver 60. The I and Q components of received signal leaving transceiver 60 may be a baseband signal that may be then further processed by at least one processor 20. Although transceiver 60 is shown as a separate component from one or more processors 20, it should be understood that in some implementations, transceiver 60 may be included as a part of one or more processors 20.

Transceiver 60 may include, but is not limited to, one or more of a transmitter, a receiver, a transceiver, protocol stacks, transmit chain components, and receive chain components. In some aspects, transceiver 60 may be dedicated to operate according to the standards and procedures of a single one of first subscription 18 or second subscription 22 at any given time. For instance, although not to be construed as limiting, transceiver 60 may be associated with a multi-SIM, multi-standby device, such as a dual-SIM, dual standby (DSDS) device.

In an aspect, capability manager component 30 may manage multi-network communication to enable mobility of UE 12, e.g. for a handover, and/or to seek to add to or improve communication quality and/or services. In one case, for example, capability manager component 30 may establish an active call connection on communication link 34 using first subscription 18 with one network wireless network, for example first network 24, while attempting to acquire and/or maintain communication and/or service using second subscription 22 with the same network or with a different network, such as second network 26. According to an example, capability manager component 30 can establish active call connection link 34 over first network 24, related to first subscription 18, via first base station 14. For instance, UE 12 and base station 14 can establish a connection to facilitate communicating in first network 24.

Further, capability manager component 30 may also include a tune away component 36 configured to manage switching transceiver 60 from operating on active call connection link 34 according to first subscription 18 to operating according to second subscription 22 to acquire and/or maintain communication and/or service with the same or with a different network. In an aspect, the tune away component 36 may include hardware (e.g., one or more processor modules of the one or more processors 20) and/or software code or instructions stored on a computer-readable medium (e.g., memory 62) and executable by at least one of the one or more processors 20 for performing the actions described herein. For example, tune away component 36 may maintain a periodic tune away timer and, upon expiration of the tune away timer, is configured to change operation of transceiver 60 and trigger capability manager component 30 to communicate according to second subscription 22. The execution of such a tune away, and the subsequent procedures, may be referred to as operating in a tune away mode. For instance, tune away component 36 may cause transceiver 60 to switch or re-initialize an operating state, such as from a first subscription operating state (e.g., for a first network communication or service, like WCDMA communication) supporting active call connection link 34 to a second subscription operating state (e.g., for a different first network service or for a different second network communication, like GSM communication). As such, initiating the tune away mode may include, but is not limited to, one or more operations with respect to transceiver 60, such as performing a wake-up of the second subscription operating state, setting up a corresponding protocol stack for processing signals and data, enabling second subscription-related clocks, RF tuning including changing a receive and/or transmit frequency or frequency range of a transmitter or receiver or transceiver, and any other overhead procedure to enable communication using second subscription 22. Further, once the second subscription operating state is enabled, tune away component 36 may be configured to cause UE 12 and/or capability manager component 30 to perform, using second subscription 22, one or more procedures in the network, such as but not limited to page demodulation, idle mode monitoring procedures, periodic cell/location/routing updates, cell reselections, etc.

In one example, tune away component 36 initiates tune away mode to communicate with a network different than the network supporting active call connection link 34, e.g. second network 26, via second base station 16. As such, tune away component 36 enables transceiver 60 to determine whether idle-mode signals are received during the tune away mode from second base station 16 corresponding to second network 26. Idle-mode signals can relate to substantially any signal broadcast in the network, e.g. second network 26, such as paging signals, broadcast control channel (BCCH) signals, or other signals that can correlate to mobility of UE 12 or otherwise. As such, tune away component 36 enables UE 12 to perform at least a first procedure or a first set of procedures, including idle-mode procedures such as page demodulation. Additionally, depending on a state of communications and/or movement of UE 12 or whether idle-mode signals are received, tune away component 36 enables UE 12 to perform additional procedures, such as but not limited to received signal processing (e.g. determining if a received page relates to second subscription 22 and optionally responding if so), periodic cell/location/routing updates, cell reselections, etc.

UE 12 further includes a memory 62, such as for storing code and/or data or computer-executable code or instructions for performing the functions described herein related to variable sized UE capability information reporting and/or local versions of applications being executed by one or more processors 20. Memory 62 can include any type of memory usable by a computer, such as random access memory (RAM), read only memory (ROM), tapes, magnetic discs, optical discs, volatile memory, non-volatile memory, and any combination thereof UE 12 may additionally include a user interface 68 operable to receive inputs from a user of UE 12, and further operable to generate outputs for presentation to the user. User interface 68 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface 68 may include one or more output devices, including but not limited to a display, a speaker, a haptic feedback mechanism, a printer, any other mechanism capable of presenting an output to a user, or any combination thereof. In an aspect, for example, the user interface 68 may present the extracted caller ID 58 to the user, and/or display an option to accept or deny a new call associated with a second subscription during a tune away from an active call on a first description, as described herein.

Additionally, UE 12 may implement the capability manager component 30, such as in specially programmed computer readable instructions or code, firmware, hardware, one or more processor components or modules, or some combination thereof, within one or more of the processors 20, memory 62, or user interface 68 shown in FIG. 1, alone or in combination.

In some aspects, UE 12 may also be referred to by those skilled in the art (as well as interchangeably herein) as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. A UE 12 may be a cellular phone, a personal digital assistant (PDA), a wireless modem, a wireless communication device, a handheld device, a tablet computer, a laptop computer, a cordless phone, a wireless local loop (WLL) station, a global positioning system (GPS) device, a multimedia device, a video device, a digital audio player (e.g., MP3 player), a camera, a game console, a wearable computing device (e.g., a smart-watch, smart-glasses, a health or fitness tracker, etc), an appliance, a sensor, a vehicle communication system, a medical device, a vending machine, a device for the Internet-of-Things, or any other similar functioning device. Additionally, base station 14, 16 may be a macrocell, picocell, femtocell, relay, Node B, mobile Node B, UE (e.g., communicating in peer-to-peer or ad-hoc mode with UE 12), or substantially any type of component that can communicate with UE 12 to provide wireless network access at UE 12.

Figure 2:
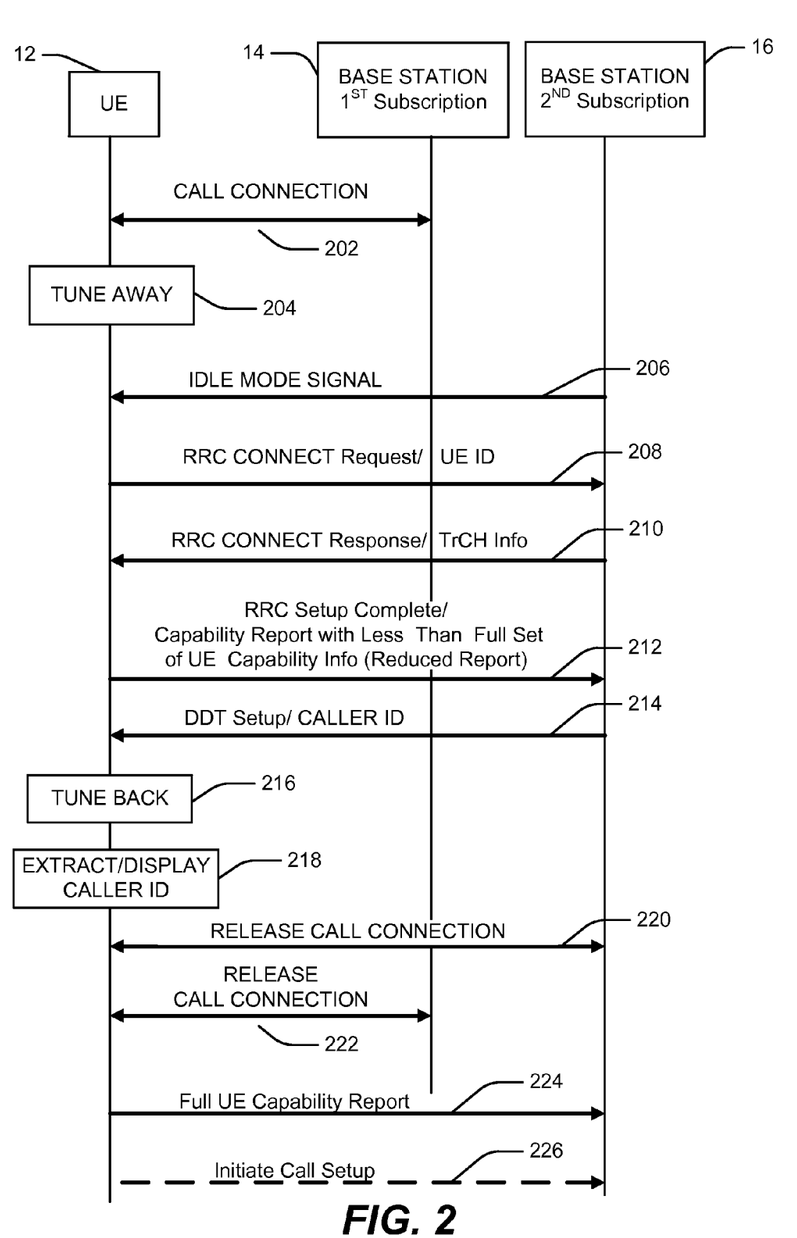
FIG. 2 is a signal and state diagram illustrating an example communication exchange between the user equipment and the network entities of FIG. 1 with respect to management of UE capability information and caller ID extraction.
Figure 3:
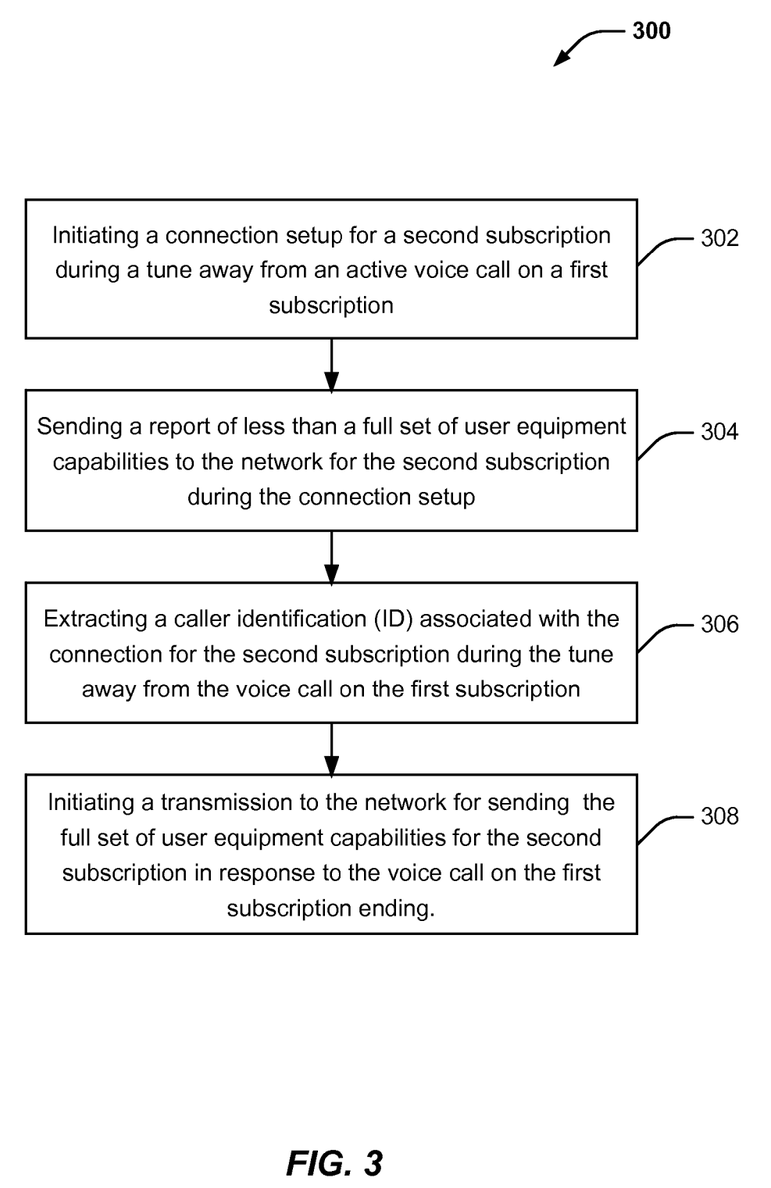
FIG. 3 is a flowchart of an aspect of a method of sending UE capability information during caller ID extraction, which may be executed by the user equipment of FIG. 1.

Referring to FIG. 2 and FIG. 3, in operational aspect, a UE such as UE 12 (FIG. 1) may include one or more processors 20 to perform one aspect of a method 300 of capability reporting for a multi-subscription UE associated with a tune away for extracting caller ID 58 on an incoming call on another subscription, which is additionally described with reference to signal and state diagram illustrated in FIG. 2. In an aspect, method 300 may be implemented by UE 12 executing capability manager component 30 and/or one or more of its sub-components as described herein. While, for purposes of simplicity of explanation, the method is shown and described as a series of acts, it is to be understood and appreciated that the method is not limited by the order of acts, as some acts may, in accordance with one or more embodiments, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

Method 300 involves UE 12 having a connection established on the first subscription 18 via base station 14. In an aspect, at block 302, the method 300 may include initiating a connection setup to a second subscription during a tune away from an active voice call on a first subscription. Referring to FIG. 2, the example signaling diagram 200 shows an exchange of signals between UE 12 and base stations 14 and 16, for an example scenario in which calls on the first subscription 18 and the second subscription 22 are provided by a common network 24 and accessed by UE 12 via separate base stations 14 and 16. Alternatively, UE 12 may receive signals related to another subscription from the same network entity, such as base station 14. In any case, call connection at 202 may be, for example, an active voice call session. UE 12 periodically may tune away to monitor signals from other network entities, such as base station 16. For example, in an aspect, UE 12 and/or capability manager component 30 and/or upper layer connection component 40 may initiate an upper layer connection procedure (e.g., an RRC connection setup), shown as RRC Connect Request signal at 208 (FIG. 2), in response to receiving an idle mode signal (e.g., a paging signal) from base station 16 related to the second subscription 22. The RRC Connect Request signal at 208 may include, for example, a UE identification to the network. To establish the connection between UE 12 and base station 16, UE 12 may receive a response to the RRC connection request, shown as RRC Connect Response at 210, which may include for example, transport channel (TrCH) information used by one or more processors 20 to establish uplink channels with base station 16. The call session on the second subscription may either proceed with radio bearer (RB) setup, or the connection on the second subscription may be released if the user decides not to take the second call. In order to extract the caller ID 58 without a perceptible disruption of the voice call session on the first subscription, the method 300 may proceed as follows.

In an aspect, at block 304, the method 300 may include sending a report of less than a full set of UE capability information to the network for the second subscription 22 during the connection setup. For example, in an aspect, during the RRC connection setup procedure, UE 12 and/or capability manager component 30 and/or capability report component 38 may format an information element for the capability report 50 having less than the full set of UE capability information for the second subscription on a condition that there is the active voice call on the first subscription (202). For example, information related to one or more capabilities of the UE (e.g., enhanced capabilities, such as E-UTRA capabilities) may be excluded from the capability report 50. Referring to FIG. 2, the UE 12 may send an RRC Setup Complete signal at 212, including capability report 50 having less than full set of UE capability information, e.g., thereby reducing a size of the packet transmission, which can quicken the transport and processing of the UE capability report by reducing the number of PDUs, and hence shortening the time taken to complete the RRC connection setup procedure. The UE 12 and/or capability manager component 30 and/or capability report component 38 may send the UE capability report 50 using transceiver 60.

In an aspect, at block 306, the method 300 may include extracting a caller identification (ID) associated with a paging signal for the second subscription received during the tune away from the voice call on the first subscription. For example, in an aspect, UE 12 and/or capability manager component 30 and/or caller ID extraction component 42 may extract the caller ID 58 from a received downlink direct transfer (DDT) setup signal, at 214, from network 24 via base station 16. For example, the extracted caller ID 58 may be displayed on the user interface 68 of the UE 12, e.g., to give the user the option to take the call, or to inform the user that there was a missed call from another user as identified by the caller ID 58. In an aspect, for example, based on the extracted the caller ID 58, if the user elected to ignore the incoming call on the second subscription 22, the user may return the ignored call upon concluding the established voice call session on the first subscription 18 at a time when the user chooses to end the call. Referring to FIG. 2, UE 12 may extract and display the caller ID, at 218, following the UE 12 tune back at 216 to the first subscription session via base station 14. Alternatively, the caller ID 58 may be extracted by UE 12 prior to the tune back, at 216, and displayed after the tune back at 216. If the user decides not to accept the incoming call on the second subscription, UE 12 may release call the connection 220 to base station 16, reducing any further use of resources that may interfere with the active voice call 202 on the first subscription.

In an aspect, at block 308, the method 300 may include sending the full set of UE capability information to the network for the second subscription in response to the voice call on the first subscription ending. For example, in an aspect, after the user ends the voice call on the first subscription, UE 12 and/or capability manager component 30 and/or capability report component 38 on processor 20 may format an information element for a second or updated capability report 52 that includes all of the UE capabilities (e.g., all enhanced capabilities, such as E-UTRA capabilities) so that UE 12 may enjoy a full range of compatible enhanced features that may be provided by network 24 on the second subscription 22. As such, a call session or other service on the second subscription 22 may be established according to one or more of the full set of UE capabilities. UE 12 and/or capability manager component 30 and/or capability report component 38 may initiate a transmission for sending the full size UE capability report 52 using transceiver 60. For example, referring to FIG. 2, upon the user ending the active voice call on the first subscription, UE 12 and/or capability manager component 30 and/or upper layer connection component 40 may release the connection 222 to base station 14, terminating the session with the first subscription 18. UE 12 may then immediately initiate a transmission for sending a signal, such as for example in accordance with a signaling procedure used in a location area update, a routing area update, and/or associated with a signaling connection release indication, to include the full set of UE capability information in updated capability report 52.

Optionally, in an aspect, the UE 12 and/or the transceiver 60 may establish a call session on the second subscription 22, shown as optional Initiate Call Setup signal 226 in FIG. 2, using the extracted caller ID 58 after sending the updated UE capability report 52, at 224, having a full set of UE capability information. The UE 12 may utilize at least one resource related to the full set of UE capabilities (e.g., enhanced capabilities) on the second subscription after the sending of the full set of UE capability information in the updated UE capability report 52.

As used in this application, the terms "component," "function", "module," "system" and the like are intended to include a computer-related entity, such as but not limited to hardware, firmware, a combination of hardware and software, software, or software in execution. For example, a component may be, but is not limited to being, a process or function running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Several aspects of improved measurement event reporting message associated with a tune away have been presented with reference to a W-CDMA system. As those skilled in the art will readily appreciate, various aspects described throughout this disclosure may be extended to other telecommunication systems, network architectures and communication standards.

By way of example, various aspects described herein related to variable reporting of UE capability information may be extended to other UMTS and/or LTE and/or other systems where UE capability information is reported on one subscription during a tune away from an active call on another subscription. For example, such UMTS systems may include TD-SCDMA, High Speed Downlink Packet Access (HSDPA), High Speed Uplink Packet Access (HSUPA), High Speed Packet Access Plus (HSPA+) and TD-CDMA. Also, such LTE and/or other systems may include Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112 (f), unless the element is expressly recited using the phrase "means for" or, in the case of a method claim, the element is recited using the phrase "step for."

What is claimed is:

1. A method of a multi-subscription user equipment (UE) reporting UE capability information to a network, comprising:
    initiating a connection setup for a second subscription during a tune away from an active voice call on a first subscription, wherein the initiating of the connection setup for the second subscription is in response to receiving a signal from the network for the second subscription during the tune away;
    generating a report of less than a full set of UE capability information for sending to the network for the second subscription during the connection setup;
    extracting a caller identification (ID) associated with the connection setup for the second subscription during the tune away from the voice call on the first subscription; and
    initiating a transmission to the network for sending the full set of UE capability information for the second subscription in response to the voice call on the first subscription ending.

2. The method of claim 1, further comprising releasing a connection for the second subscription after the extracting of the caller ID, and tuning back to the voice call on the first subscription.

3. The method of claim 1, further comprising formatting an information element for the report of less than the full set of UE capability information to exclude one or more E-UTRA capabilities on a condition that there is the active voice call on the first subscription.

4. The method of claim 1, further comprising initiating a call on the second subscription using the extracted caller ID after sending the full set of UE capability information.

5. The method of claim 1, wherein generating a report of less than a full set of UE capability information comprises generating the report having a first size less than a second size of a full report of the full set of UE capability information.

6. A user equipment (UE) for reporting UE capability information to a network, the UE comprising:
   a transceiver configured to transmit a connection setup signal for a second subscription during a tune away from an active voice call on a first subscription, wherein the transceiver is configured to transmit the connection setup signal in response to receiving a paging message from the network for the second subscription during the tune away;
   at least one processor coupled to the transceiver via a bus, the at least one processor configured to extract a caller identification (ID) associated with the connection setup for the second subscription during the tune away from the voice call on the first subscription; and to generate a report of less than a full set of UE capability information for sending to the network for the second subscription during the connection setup; and to initiate a transmission to the network for sending the full set of UE capability information for the second subscription in response to the voice call on the first subscription ending; and
   a user interface for displaying the extracted caller ID;
   wherein the transceiver is further configured to transmit a connection release signal for ending the voice call on the first subscription.

7. The UE of claim 6, wherein the transceiver is further configured to receive a signal from the network with information including the caller ID, to tune back to the voice call on the first subscription after receiving the signal, and to send a release connection for the second subscription after the extraction of the caller ID.

8. The UE of claim 6, wherein the at least one processor is further configured to format an information element for the report of less than the full set of UE capability information to exclude one or more enhanced UE capabilities.

9. The UE of claim 6, wherein the at least one processor is further configured to initiate a call on the second subscription using the extracted caller ID after the sending of the full set of UE capability information and the transceiver is further configured to send a signal to the network to establish a connection for the call on the second subscription.

10. The UE of claim 6, wherein the at least one processor generates the report of less than a full set of UE capability information having a first size less than a second size of a full report of the full set of UE capability information.

11. A user equipment (UE) for reporting UE capability information to a network, the UE comprising:
   means for receiving a paging message for a second subscription during a tune away from an active voice call on a first subscription;
   means for initiating a connection procedure to the second subscription in response to the received paging message;
   means for transmitting a connection setup signal for the second subscription during the tune away from the active voice call on the first subscription;
   means for extracting a caller identification (ID) associated with the connection setup for the second subscription during the tune away from the voice call on the first subscription;
   means for generating a report of less than a full set of UE capability information for sending to the network for the second subscription during the connection setup;
   means for sending the full set of UE capability information to the network for the second subscription in response to the voice call on the first subscription ending;
   means for displaying the extracted caller ID; and
   means for transmitting a connection release signal for ending the voice call on the first subscription.

12. The UE of claim 11, further comprising:
   means for receiving a signal from the network with information including the caller ID, for tuning back to the voice call on the first subscription after receiving the signal, and for sending a release connection for the second subscription after the extraction of the caller ID.

13. The UE of claim 11 further comprising:
   means for formatting an information element for the report of less than the full set of UE capability information to exclude one or more enhanced UE capabilities.

14. The UE of claim 11, further comprising:
   means for initiating a call on the second subscription using the extracted caller ID after the sending of the full set of UE capability information and
   means for sending a signal to the network to establish a connection for the call on the second subscription.

15. The UE of claim 11, wherein the means for generating a report of less than a full set of UE capability information further generates the report having a first size less than a second size of a full report of the full set of UE capability information.

16. A non-transitory computer-readable medium storing computer executable code for managing UE capability reports to a network, comprising:
   code for receiving a paging message for a second subscription during a tune away from an active voice call on a first subscription;
   code for initiating a connection procedure to the second subscription in response to the received paging message;
   code for transmitting a connection setup signal for the second subscription during the tune away from the active voice call on the first subscription;
   code for extracting a caller identification (ID) associated with the connection setup for the second subscription during the tune away from the voice call on the first subscription;
   code for generating a report of less than a full set of UE capability information for sending to the network for the second subscription during the connection setup;
   code for sending the full set of UE capability information to the network for the second subscription in response to the voice call on the first subscription ending;
   code for displaying the extracted caller ID; and
   code for transmitting a connection release signal for ending the voice call on the first subscription.

17. The non-transitory computer-readable medium of claim 16, further comprising:
   code for receiving a signal from the network with information including the caller ID, for tuning back to the voice call on the first subscription after receiving the signal, and for sending a release connection for the second subscription after the extraction of the caller ID.

18. The non-transitory computer-readable medium of claim 16, further comprising:
    code for formatting an information element for the report of less than the full set of UE capability information to exclude one or more enhanced UE capabilities.

19. The non-transitory computer-readable medium of claim 16, further comprising:
    code for initiating a call on the second subscription using the extracted caller ID after the sending of the full set of UE capability information and
    code for sending a signal to the network to establish a connection for the call on the second subscription.

20. The non-transitory computer-readable medium of claim 16, wherein code for generating a report of less than a full set of UE capability information further comprises generating the report having a first size less than a second size of a full report of the full set of UE capability information.

* * * * *